(12) United States Patent
Chen et al.

(10) Patent No.: US 7,333,568 B2
(45) Date of Patent: Feb. 19, 2008

(54) DATA SLICER CAPABLE OF CALIBRATING CURRENT MISMATCH

(75) Inventors: Chih-Cheng Chen, Hsin-Chu (TW); Shang-Ping Chen, Tai-Chung (TW)

(73) Assignee: MediaTek Inc., Hsin-Chu Hsien (TW)

( * ) Notice: Subject to any disclaimer, the term of this patent is extended or adjusted under 35 U.S.C. 154(b) by 774 days.

(21) Appl. No.: 10/708,616

(22) Filed: Mar. 15, 2004

(65) Prior Publication Data

US 2005/0074076 A1    Apr. 7, 2005

(30) Foreign Application Priority Data

Oct. 6, 2003    (TW) ............................... 92127703 A

(51) Int. Cl.
   *H04L 25/06*    (2006.01)
   *H04L 25/10*    (2006.01)
(52) U.S. Cl. ................. 375/317; 369/59.17; 369/59.21
(58) Field of Classification Search ................ 375/317; 369/59.17
   See application file for complete search history.

(56) References Cited

U.S. PATENT DOCUMENTS

| | | | |
|---|---|---|---|
| 6,349,121 B1 * | 2/2002 | Anderson | 375/317 |
| 6,424,630 B1 * | 7/2002 | Ang | 370/251 |
| 6,631,103 B1 * | 10/2003 | Yamanoi et al. | 369/47.17 |
| 2002/0070765 A1 * | 6/2002 | Tsujikawa | 327/66 |
| 2004/0042368 A1 * | 3/2004 | Kwag et al. | 369/59.17 |
| 2004/0141450 A1 * | 7/2004 | Hung et al. | 369/59.17 |

* cited by examiner

*Primary Examiner*—Shuwang Liu
*Assistant Examiner*—David Huang
(74) *Attorney, Agent, or Firm*—Winston Hsu

(57) ABSTRACT

A data slicer includes a comparator coupled with an input signal and a reference signal for generating a sliced signal, a waveform generator for generating a calibration signal, a pulse extension device coupled to the comparator and the waveform generator for modifying the duty cycle of the sliced signal or the calibration signal to output, a charge pump coupled between the pulse extension device and a first node for charging and discharging the first node according to the signal output from the pulse extension device, a determining circuit for adjusting the data slicer according to the level change at the first node, and a feedback device coupled between the first node and the comparator for generating the reference signal.

25 Claims, 4 Drawing Sheets

DATA SLICER CAPABLE OF CALIBRATING CURRENT MISMATCH

BACKGROUND OF INVENTION

1. Field of the Invention

The invention relates to a data slicer, and more particularly, to a data slicer capable of calibrating charge and discharge current mismatch.

2. Description of the Prior Art

Digital data slicers, which compare analog signals with a reference level signal to determine whether the binary value of the input signal is "0" or "1", i.e. to convert analog input signals into digital output signals, are widely used in transmission systems.

Please refer to FIG. 1 showing a block diagram of a conventional digital data slicer 100. The data slicer 100 has a comparator 110, an inverter 115, a charge pump 120, and a low pass filter 130. The charge pump includes a current source 121, a first switch 122, a second switch 123, and a current sink 124. In FIG. 1, the first switch 122 or the second switch 123 is turned on when the signal input to its control end is at high level respectively. When a sliced signal $V_{out}$ is at high level, the first switch 122 is turned on and the second switch 123 is turned off, and the voltage source 121 charges node A. When the sliced signal $V_{out}$ is at low level, the first switch 122 is turned off and the second switch 123 is turned on, and the current sink 124 discharges node A.

After processing voltage signals at node A with the low pass filter 130, a reference signal $V_{ref}$ is generated, and the comparator 110 can generate the sliced signal $V_{out}$ by comparing an input signal $V_{in}$ with the reference signal $V_{ref}$. Theoretically, the current generated by the current source 121 or the current sink 124 must be the same in order to have a stable and accurate performance on data slicing.

However, it is very difficult to manufacture a current source 121 and a current sink 124 having the same charge or discharge current. Under the condition that there is a current mismatch between them, after a few periods, the error will be accumulated so that the whole system might become unstable and generate an erroneous sliced signal $V_{out}$. This is the main problem in the prior art.

SUMMARY OF INVENTION

It is therefore a primary objective of the claimed invention to provide a data slicer capable of calibrating current mismatch in order to solve the problem mentioned above.

Briefly, a data slicer includes a comparator coupled with an input signal and a reference signal for generating a sliced signal, a waveform generator for generating a calibration signal, a pulse extension device coupled to the comparator and the waveform generator for modifying the duty cycle of the sliced signal or the calibration signal to output, a charge pump coupled between the pulse extension device and a first node for charging and discharging the first node according to the signal output from the pulse extension device, a determining circuit for adjusting the data slicer according to the level change at the first node, and a feedback device coupled between the first node and the comparator for generating the reference signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
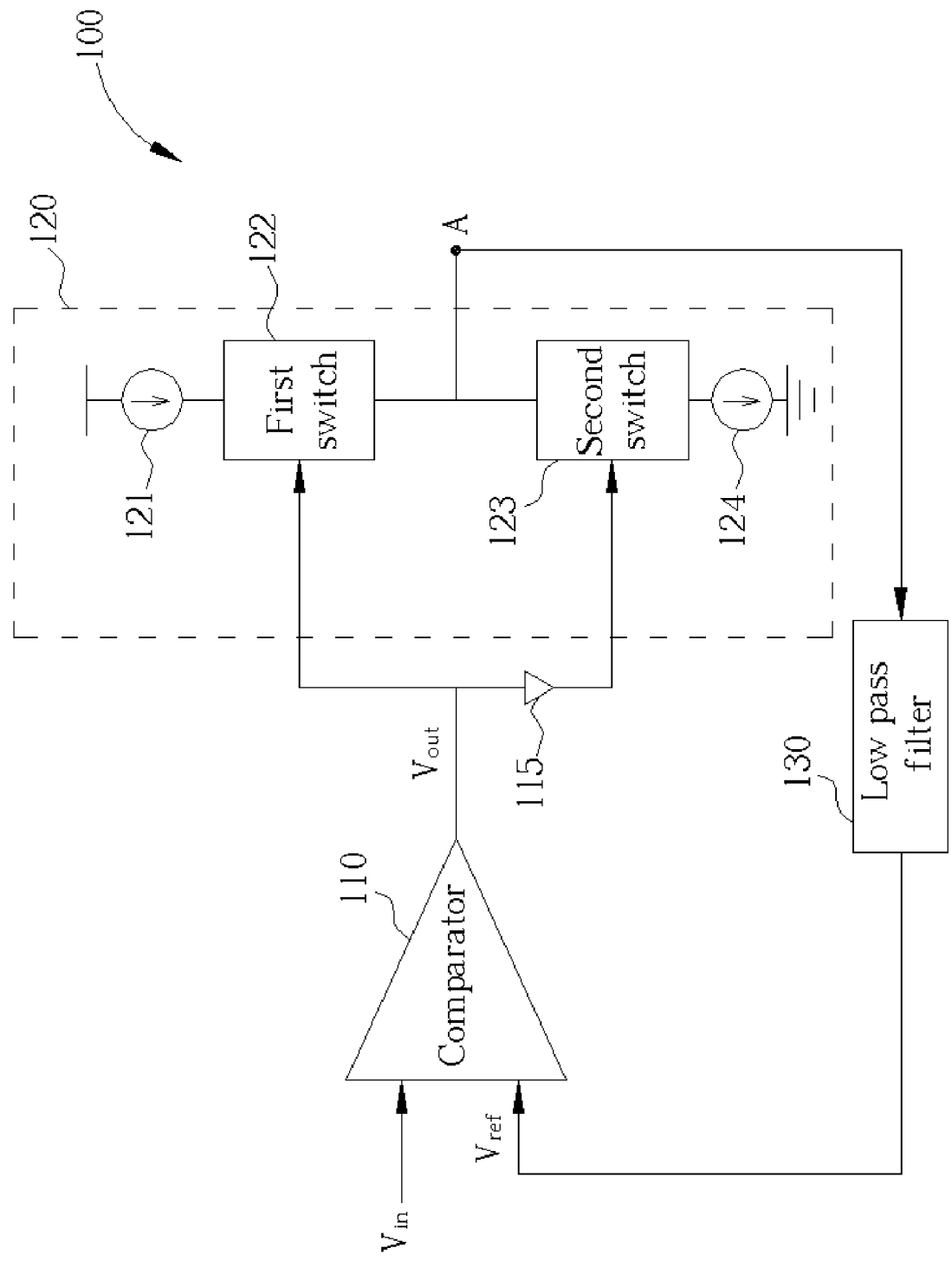
FIG. 1 is a block diagram of a conventional digital data slicer.
Figure 2:
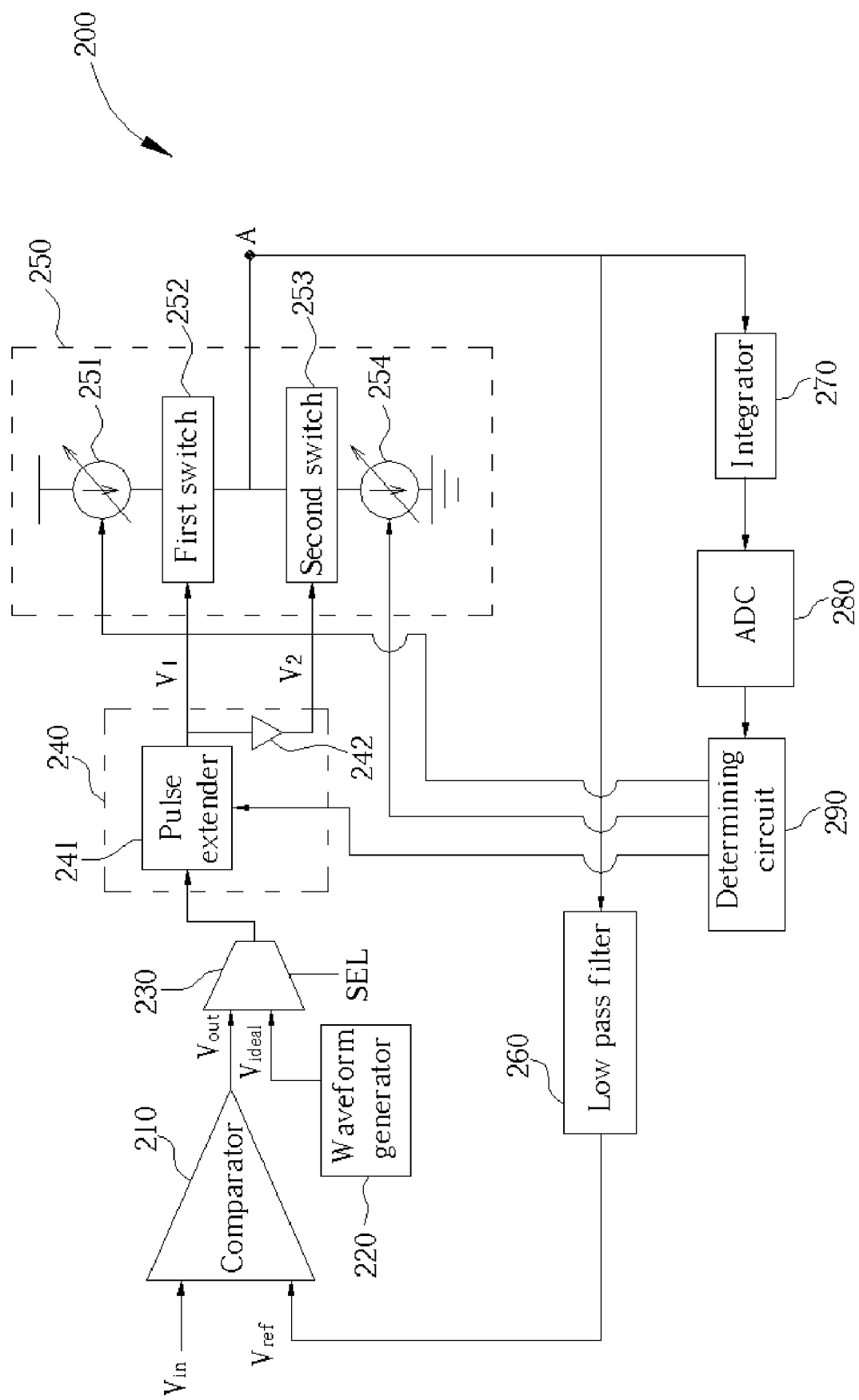
FIG. 2 is a block diagram of a digital data slicer according to the first embodiment of the present invention.

Please refer to FIG. 2 showing a block diagram of a digital data slicer 200 according to the first embodiment of the present invention. The data slicer 200 includes a comparator 210 for generating a sliced signal $V_{out}$ according to an input signal $V_{in}$ and a reference signal $V_{ref}$, a waveform generator 220 for generating a calibration signal $V_{ideal}$ in duty cycle of 50%, a multiplexer 230 coupled with the comparator 210 and the waveform generator 220 for selectively outputting the sliced signal $V_{out}$ or the calibration signal $V_{ideal}$ according to a selection signal SEL, a pulse extension device 240 coupled with the multiplexer 230 for modifying the duty cycle of the sliced signal $V_{out}$ or the calibration signal $V_{ideal}$, a tunable charge pump 250 coupled between the pulse extension device 240 and a first node A for charging or discharging the first node A according to a first modifying signal $V_1$ and a second modifying signal $V_2$, a feedback device (a low pass filter 260 in this embodiment) coupled between the first node A and the comparator 210 for generating the reference signal $V_{ref}$, a determining circuit 290 for adjusting the data slicer 200 according to the level change at the first node A, an integrator 270 coupled with the first node A, and an analog-to-digital converter (ADC) 280 coupled between the integrator 270 and the determining circuit 290.

Furthermore, in the present embodiment, the pulse extension device 240 includes a pulse extender 241 for modifying the duty cycle of the sliced signal $V_{out}$ or the calibration signal $V_{ideal}$ in order to generate the first modifying signal $V_1$, and an inverter 242 coupled with the pulse extender 241 for generating the second modifying signal $V_2$, inverse to the first modifying signal $V_1$. The tunable charge pump 250 includes a tunable current source 251, a first switch 252, a second switch 253 (the first switch 252 and the second switch 253 will be turned on when their input signal is at high level), and a tunable current sink 254. For example, when the first modifying signal $V_1$ is at high level and the second modifying signal $V_2$ is at low level, the first switch 252 is turned on and the second switch 253 is turned off. And when the first modifying signal $V_1$ is at low level and the second modifying signal $V_2$ is at high level, the first switch 252 is turned off and the second switch 253 is turned on.

When the data slicer 200 is in a calibration mode, the multiplexer 230 outputs the calibration signal $V_{ideal}$ to the pulse extension device 240 according to the selection signal SEL. The calibration signal $V_{ideal}$ is a periodic signal with period $T_C$ and duty cycle preset to 50%. And initially the output of the pulse extension device 240 equals to its input before the pulse extension device 240 being adjusted by the determining circuit 290. Theoretically, if the tunable charge pump 250 is an ideal one, the level increase at node A due to the charging process should be exactly eliminated by the discharging process during each period $T_C$ of the calibration signal $V_{ideal}$. In result, the level at node A at each time instant $N \cdot T_C$ should remain the same value for any integer N.

However, in practical, the tunable charge pump 250 would not be an ideal one so that the charging current always mismatches the discharging current, which in turn results in that the level at node A will change rather than stay at a constant value. To solve this problem, the level at node A is fed to the integrator 270 to get the accumulated level at the node A. The output of the integrator 270 is then fed to the ADC 280 to get a digital version of the accumulated level at the node A. Let U(N) denote the digital version of the accumulated level at the node A at time instant N·$T_C$, where N is an integer. The determining circuit 290 is then employed to compare the values of U($N_1$) and U($N_2$) with $N_1$<$N_2$ in order to determine how to adjust the data slicer 200.

When the value of the output signal of the ADC 280 decreases, i.e. U($N_1$)>U($N_2$), based on the structure shown in FIG. 2, the determining circuit 290 can calibrate the mismatch in one of the following manners: adjusting the pulse extender 241 to enlarge the duty cycle of the first modifying signal $V_1$, adjusting the tunable current source 251 to enlarge the charging current, or adjusting the tunable current sink 254 to lessen the discharging current (of course, more than one of these manners can be executed at the same time). On the other hand, when the value of the output signal of the ADC 280 increases, i.e. U($N_1$)<U($N_2$), the determining circuit 290 can calibrate the mismatch in the inverse of the above three manners.

Figure 3:
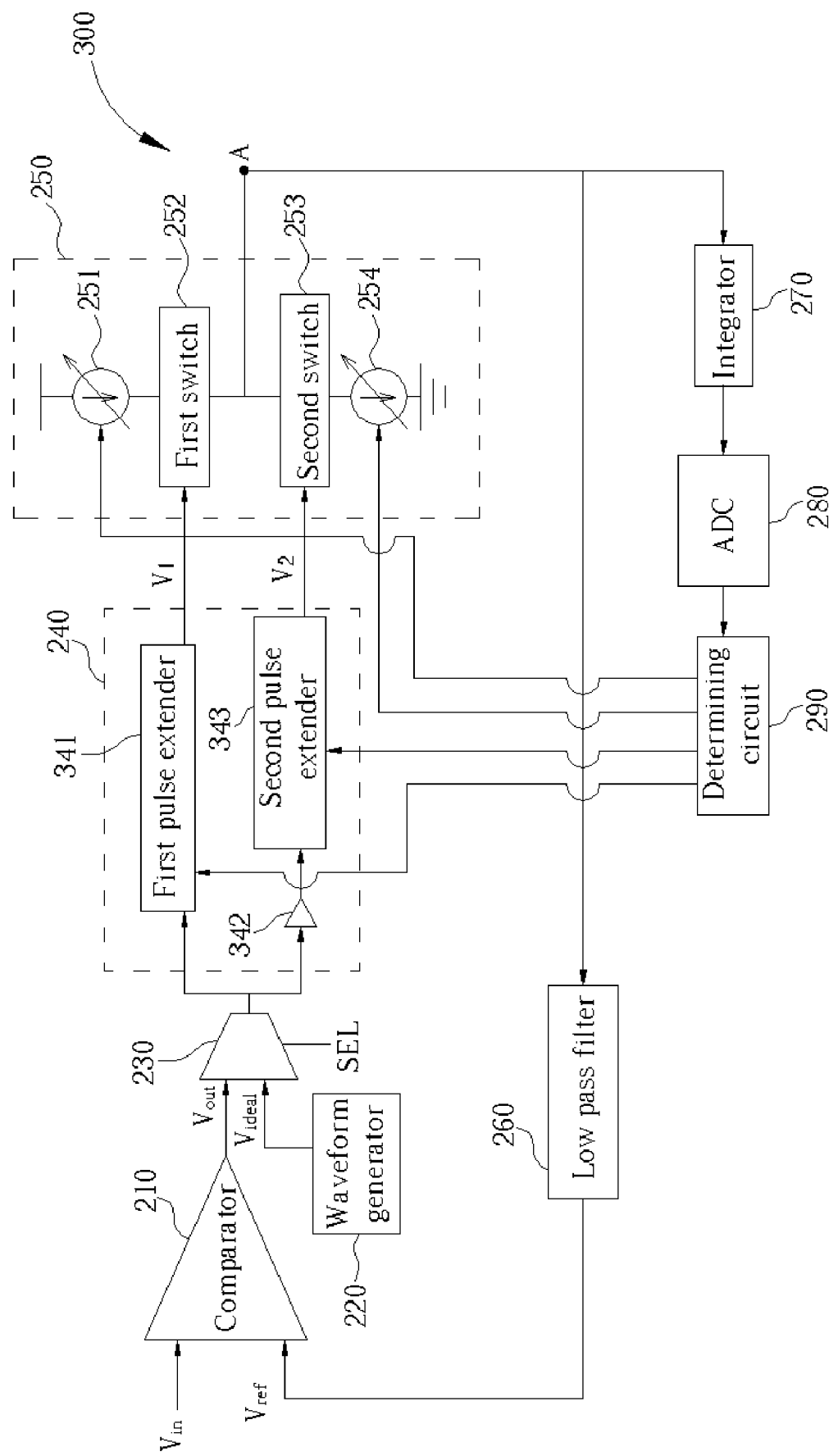
FIG. 3 is a block diagram of a digital data slicer according to the second embodiment of the present invention.

In the structure shown in FIG. 2, the first modifying signal $V_1$ is inverse to the second modifying signal $V_2$; the first switch 252 and the second switch 253 are turned on and off alternately. However, the first modifying signal $V_1$ does not necessarily have to be exactly inverse to the second modifying signal $V_2$. The determining circuit 290 can adjust the duty cycle of the first modifying signal $V_1$ and the second modifying signal $V_2$ respectively in order to increase the resolution of the adjustment. Please refer to FIG. 3 showing a block diagram of a digital data slicer 300 according to the second embodiment of the present invention. The difference between the data slicer 300 in the second embodiment and the data slicer 200 in the first embodiment is that a pulse extension device 240 in the second embodiment includes a first pulse extender 341 coupled with a multiplexer 230 for receiving a sliced signal $V_{out}$ or a calibration signal $V_{ideal}$ to modify their duty cycle in order to generate a first modifying signal $V_1$, an inverter 342 coupled to the multiplexer 230 for receiving the sliced signal $V_{out}$ or the calibration signal $V_{ideal}$ to output them after inversion, and a second pulse extender 343 coupled to the inverter 342 for receiving an inverse version of the sliced signal $V_{out}$ or the calibration signal $V_{ideal}$ to modify their duty cycle in order to generate a second modifying signal $V_2$. In this embodiment, a determining circuit 290 is capable of calibrating both the first pulse extender 341 and the second pulse extender 343. Based on the structure shown in FIG. 3, when the value of an output signal of an ADC 280 decreases, i.e. U($N_1$)>U($N_2$), besides the three calibration methods mentioned above, a fourth manner to increase the adjustment resolution more is available by adjusting the second pulse extender 343 to shorten the duty cycle of the second modifying signal $V_2$.

Figure 4:
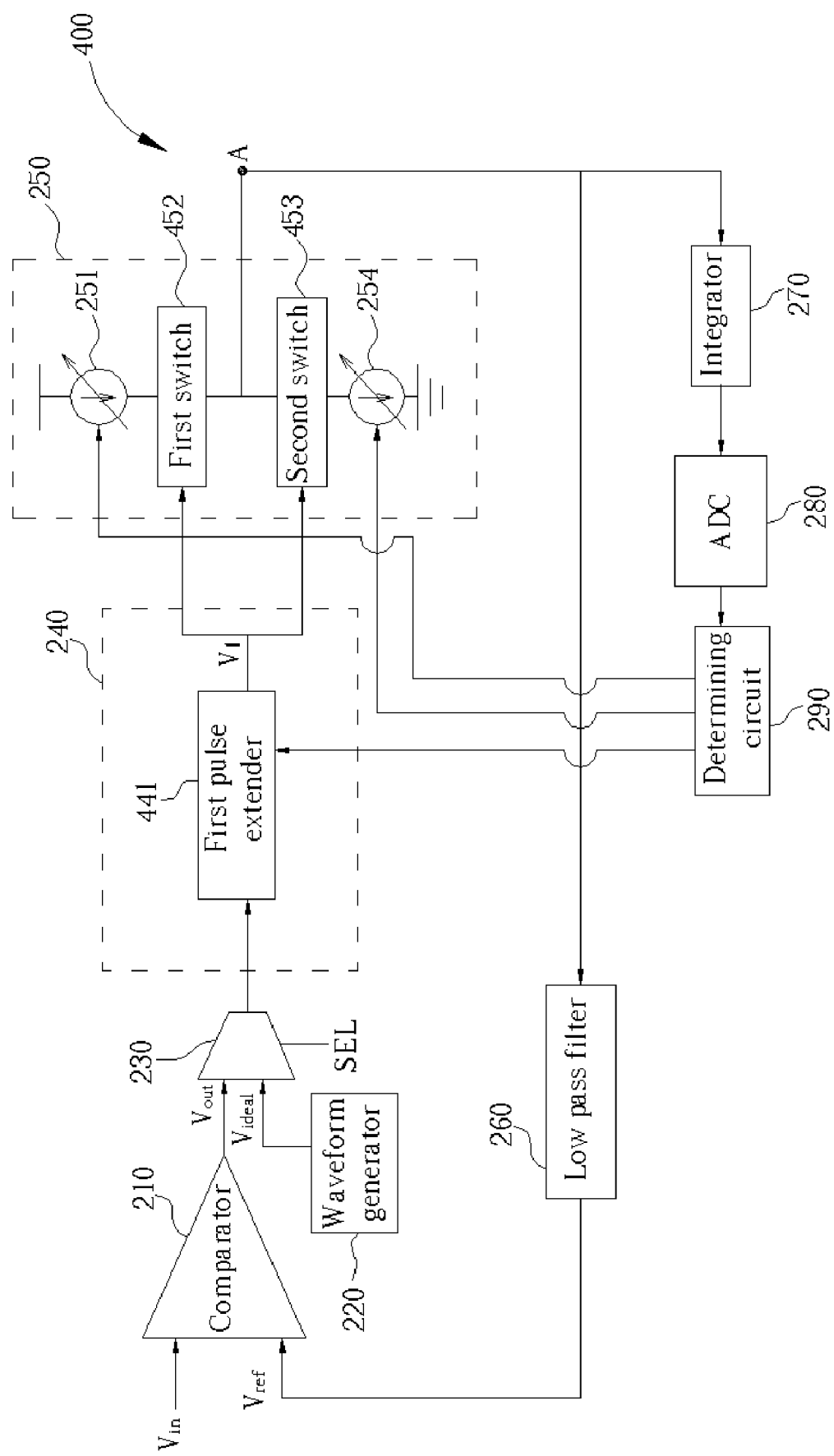
FIG. 4 is a block diagram of a digital data slicer according to the third embodiment of the present invention.

In the embodiments described above, the first switch 252 and the second switch 253 will be turned on when their signal input is at high level. However, it is also possible to have another design where one of the switches is to be turned on when its signal input is at high level, while the other switch turned on when its signal input is at low level. Please refer to FIG. 4 showing a block diagram of a digital data slicer 400 according to the third embodiment of the present invention. The difference between the data slicer 400 in the third embodiment and the data slicer 200 in the first embodiment is that a pulse extension device 240 in the third embodiment does not include any inverter, and a first switch 452 of a tunable charge pump 250 is turned on when its signal input is at high level and a second switch 453 of a tunable charge pump 250 is turned on when its signal input is at low level. Except this difference, the operation in the third embodiment is the same as that in the first embodiment. However, the adjustment resolution in the third embodiment may not be as good as that in the second embodiment.

As an example, the person skilled in the art can simply combine a single OR gate (or AND gate) with a single buffer (for delaying signals) into a single pulse extension unit, and combine a plurality of pulse extension units with one or more multiplexers controlled by the determining circuit 290 into any of the pulse extender described above. Also, as an example, the person skilled in the art can simply compose the tunable current source (or the tunable current sink) by using a plurality of current sources (or current sinks) combined with different switches controlled by the determining circuit 290.

In addition, an advantageous property of the present invention is described as below: The calibration strategy according to the present invention is flexible so that the present invention is feasible for a variety of operating frequencies. For instance, assume that in the three embodiments described above, the adjustment resolution, denoted by $R_T$, of the pulse extension device 240 is T/100, and the adjustment resolution, denoted by $R_I$, of the tunable charge pump 250 is I/100 (I and T are preset constants). For example, consider the data slicer is processing low frequency signals wherein the period of the data is T and the charging/discharging current of the tunable charge pump 250 is to be I/10. It can be seen that the ratio of T to $R_T$ is higher that that of I/10 to $R_I$. Therefore if an error exists, the determining circuit 290 can coarsely tune the tunable charge pump 250 and finely tune the pulse extension device 240. Another example, consider the data slicer is processing high frequency signals, wherein the period of the data is T/10 and the charging/discharging current of the tunable charge pump 250 is to be I (assuming that the current in high frequency operation of the tunable charge pump 250 is 10 times to that in low frequency operation). It can be seen that the ratio of T/10 to $R_T$ is lower that that of I to $R_I$. Therefore if an error exists, the determining circuit 290 can finely tune the tunable charge pump 250 and coarsely tune the pulse extension device 240. Accordingly, the system can operate under a high power or low power environment and is still capable of calibrating current mismatch.

Among the three embodiments described above, if the value of the output signal of the ADC 280 remains the same or are substantially the same, i.e. U($N_1$)≈U($N_2$), it would mean the determining circuit 290 has successfully calibrated the current mismatch. In this case the system can then end the calibration mode and enter into a signal slicing mode. The selection signal will switch the multiplexer 230 to output the sliced signal $V_{out}$ to the pulse extension device 240. And in the closed loop composed of the comparator 210, the multiplexer 230, the pulse extension device 240, the tunable charge pump 250, and the low pass filter 260, the sliced signal $V_{out}$ can accurately represent the value of the input signal $V_{in}$.

In contrast to the prior art, the data slicer according to the present invention is capable of calibrating current mismatch so that an error may not be enlarged as in the prior art. Moreover, the system according to the present invention can apply different calibration methods according to different operating frequencies so that the processing range can be improved and the stability under different conditions can be improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data slicer comprising:
   a comparator coupled with an input signal and a reference signal for generating a sliced signal;
   a waveform generator for generating a calibration signal;
   a pulse extension device coupled to the comparator and the waveform generator for modifying the duty cycle of either the sliced signal or the calibration signal to output;
   a charge pump coupled between the pulse extension device and a first node for charging and discharging the first node according to a signal output from the pulse extension device;
   a determining circuit for adjusting the data slicer according to the level change at the first node;
   a feedback device coupled between the first node and the comparator for generating the reference signal; and
   a multiplexer coupled with the comparator, the waveform generator, and the pulse extension device for selectively outputting the sliced signal or the calibration signal to the pulse extension device.

2. The data slicer of claim 1 further comprising:
   an integrator coupled with the first node; and
   an analog-to-digital converter (ADC) coupled between the integrator and the determining circuit.

3. The data slicer of claim 2 wherein when the multiplexer outputs the calibration signal to the pulse extension device, the determining circuit compares the output values of the ADC at two different time instants $N_1 \cdot T_C$ and $N_2 \cdot T_C$ to determine how to adjust the data slicer, where $T_C$ represents the period of the calibration signal and $N_1$ and $N_2$ are integers.

4. The data slicer of claim 2 wherein the pulse extension device is for receiving the sliced signal or the calibration signal and modifying the duty cycle of the received signal at the pulse extension device in order to generate a first modifying signal and a second modifying signal.

5. The data slicer of claim 4 wherein the pulse extension device comprises:
   a pulse extender coupled with the multiplexer for receiving the sliced signal or the calibration signal and modifying the duty cycle of the received signal at the pulse extender in order to generate the first modifying signal; and
   an inverter coupled with the pulse extender for generating the second modifying signal inverse to the first modifying signal.

6. The data slicer of claim 5 wherein the determining circuit is coupled to the pulse extender for adjusting the pulse extender.

7. The data slicer of claim 4 wherein the pulse extension device comprises:
   a first pulse extender coupled with the multiplexer for receiving the sliced signal or the calibration signal and modifying the duty cycle of the received signal at the first pulse extender in order to generate the first modifying signal;
   an inverter coupled with the multiplexer for receiving the sliced signal or the calibration signal and outputting them after inversion; and
   a second pulse extender coupled with the inverter for receiving the inverted version of the sliced signal or the calibration signal and modifying the duty cycle of the received signal at the second pulse extender in order to generate the second modifying signal.

8. The data slicer of claim 7 wherein the determining circuit is coupled to the first pulse extender for adjusting the first pulse extender.

9. The data slicer of claim 7 wherein the determining circuit is coupled with the second pulse extender for adjusting the second pulse extender.

10. The data slicer of claim 4 wherein the charge pump is a tunable charge pump.

11. The data slicer of claim 4 wherein the charge pump comprises:
    a first tunable charge pump unit coupled between the pulse extension device and the first node for charging the first node according to the first modifying signal; and
    a second tunable charge pump unit coupled between the pulse extension device and the first node for discharging the first node according to the second modifying signal.

12. The data slicer of claim 11 wherein the first tunable charge pump unit comprises:
    a tunable current source; and
    a first switch coupled between the tunable current source and the first node for charging the first node according to the first modifying signal.

13. The data slicer of claim 12 wherein the determining circuit is coupled with the tunable current source for adjusting the tunable current source.

14. The data slicer of claim 11 wherein the second tunable charge pump unit comprises:
    a tunable current sink; and
    a second switch coupled between the tunable current sink and the first node for discharging the first node according to the second modifying signal.

15. The data slicer of claim 14 wherein the determining circuit is coupled with the tunable current sink for adjusting the tunable current sink.

16. The data slicer of claim 2 wherein the pulse extension device is for receiving the sliced signal or the calibration signal to modify the duty cycle of the received signal at the pulse extension device in order to generate a first modifying signal.

17. The data slicer of claim 16 wherein the pulse extension device comprises:
    a pulse extender coupled with the multiplexer for receiving the sliced signal or the calibration signal to modify the duty cycle of the received signal at the pulse extender in order to generate the first modifying signal.

18. The data slicer of claim 17 wherein the determining circuit is coupled to the pulse extender for adjusting the pulse extender.

19. The data slicer of claim 16 wherein the charge pump is a tunable charge pump.

20. The data slicer of claim 16 wherein the charge pump comprises:
    a first tunable charge pump unit coupled between the pulse extension device and the first node for charging the first node according to the first modifying signal; and a second tunable charge pump unit coupled between the pulse extension device and the first node for discharging the first node according to the first modifying signal.

21. The data slicer of claim 20 wherein the first tunable charge pump unit comprises:
    a tunable current source; and
    a first switch coupled between the tunable current source and the first node for charging the first node according to the first modifying signal.

22. The data slicer of claim 21 wherein the determining circuit is coupled with the tunable current source for adjusting the tunable current source.

23. The data slicer of claim 20 wherein the second tunable charge pump unit comprises:
    a tunable current sink; and
    a second switch coupled between the tunable current sink and the first node for discharging the first node according to the first modifying signal.

24. The data slicer of claim 23 wherein the determining circuit is coupled with the tunable current sink for adjusting the tunable current sink.

25. The data slicer of claim 1 wherein the feedback device is a low pass filter.

* * * * *